US007755815B2

(12) United States Patent
Nakamura et al.

(10) Patent No.: US 7,755,815 B2
(45) Date of Patent: Jul. 13, 2010

(54) IMAGE READING APPARATUS AND IMAGE FORMATION APPARATUS

(75) Inventors: Fumihiko Nakamura, Tokyo (JP); Takafumi Katayama, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 12/054,972

(22) Filed: Mar. 25, 2008

(65) Prior Publication Data
US 2008/0239415 A1 Oct. 2, 2008

(30) Foreign Application Priority Data
Mar. 30, 2007 (JP) ............... 2007-090561

(51) Int. Cl.
*H04N 1/04* (2006.01)
(52) U.S. Cl. ..................... 358/498; 358/496
(58) Field of Classification Search ................ 358/498, 358/496; 399/367, 371, 372
See application file for complete search history.

(56) References Cited

U.S. PATENT DOCUMENTS 6,985,692 B2    1/2006  Nakamura ................ 399/367
7,079,294 B1 *  7/2006  Nakagawa et al. ........... 358/496
2003/0161012 A1 * 8/2003  Kusunose ..................... 358/498
2004/0065991 A1  4/2004  Watanabe et al.
2006/0256402 A1 11/2006  Katayama .................... 358/474

FOREIGN PATENT DOCUMENTS

JP    2003-51915    2/2003

* cited by examiner

*Primary Examiner*—Cheukfan Lee
(74) *Attorney, Agent, or Firm*—Fitzpatrick, Cella, Harper & Scinto

(57) ABSTRACT

An image reading apparatus has a reading portion configured to read the image of the original at the reading position located on a supporting surface for supporting the original, an original feeding portion configured to convey an original to the reading position, a movable guide portion which faces the supporting surface and guides the original conveyed by the original conveying portion to the reading position, and a biasing member configured to apply a biasing force to the guide portion toward the supporting surface, wherein the movable guide portion has a rib portion, the rib portion projects toward the supporting surface and is formed along the original conveying direction, and the rib portion presses an original, that is read by the reading portion while the original is conveyed by the conveying portion, to the supporting surface by the biasing force of the biasing member.

11 Claims, 13 Drawing Sheets

READING POSITION Y

READING POSITION Y

IMAGE READING APPARATUS AND IMAGE FORMATION APPARATUS

BACKGROUND OF THE INVENTION

1. Field of the Invention

The present invention relates to an image reading apparatus for reading information of conveyed original and an image formation apparatus using the same.

2. Description of the Related Art

In a case where an image is read by means of an image reading apparatus, an original of the image has to be in intimate contact with a platen glass at a reading position. For this reason, as shown in FIG. 12, a conventional image reading apparatus has a reading white plate 101 for allowing an original S to be in intimate contact with a platen glass 100 at the reading position.

It has been proposed that in order to securely prevent the original from floating at the reading position, a flexible sheet member 102 is provided upstream of the original reading position in the conveying direction to prevent image reading disturbance so that reading accuracy is improved (Patent document 1: Japanese Patent Application Laid-Open No. 2003-051915).

However, in the case of the above-described structure, since the original is pressed by means of the sheet member 102, the contact surface between the sheet member and the original becomes large. Thus, friction noise produced by the sheet member and the original is likely to be considerable. In a case where pressing force of the original is to be increased in order to improve the reading accuracy, when the number of the sheet member 102 is increased in the original width direction or the width of the sheet member 102 is increased, the friction noise is further likely to be bigger.

In the case of the above-described structure, since the sheet member 102 constantly presses the original, at the moment the rear end of the original passes over the sheet member 102, the load applied to the original is released, so that sometimes load fluctuation occurs. Due to the occurrence of the load fluctuation, reading accuracy of the original image may be deteriorated, or the original may flap to generate noise.

SUMMARY OF THE INVENTION

The present invention has been developed, considering the above-described conditions, and provides an image reading apparatus and an image formation apparatus in which image reading accuracy is excellent while noise from the conveyed original is reduced.

An image reading apparatus of the present invention for solving the problem mentioned above is an image reading apparatus having the following. It has a reading portion configured to read the image of the original at the reading position located on a supporting surface for supporting the original, an original feeding portion configured to convey an original to the reading position, a movable guide portion which faces the supporting surface and guides the original conveyed by the original conveying portion to the reading position, and a biasing member configured to apply a biasing force to the guide portion toward the supporting surface, wherein the movable guide portion has a rib portion, the rib portion projects toward the supporting surface and is formed along the original conveying direction, and the rib portion presses an original, that is read by the reading portion while the original is conveyed by the conveying portion, to the supporting surface by the biasing force of the biasing member.

Further, an image reading apparatus of the present invention is an image reading apparatus having the following. It has a reading portion configured to read the image of the original at the reading position located on a supporting surface for supporting the original, an original feeding portion configured to convey an original to the reading position, a guide portion which face to the supporting surface and guides the original conveyed by the original conveying portion to the reading position, and a movement portion which moves the pressing member between a pressing position for pressing an original to the supporting surface and a separation position which is separated more than the pressing position from the supporting surface.

The present invention provides an apparatus in which noise from an original which is conveyed can be reduced and in which reading accuracy is excellent.

Further features of the present invention will become apparent from the following description of exemplary embodiments with reference to the attached drawings.

DESCRIPTION OF THE EMBODIMENTS

Next, an image reading apparatus according to one embodiment of the present invention is described illustrating an image formation apparatus having the image reading apparatus.

First Embodiment

Figure 1:
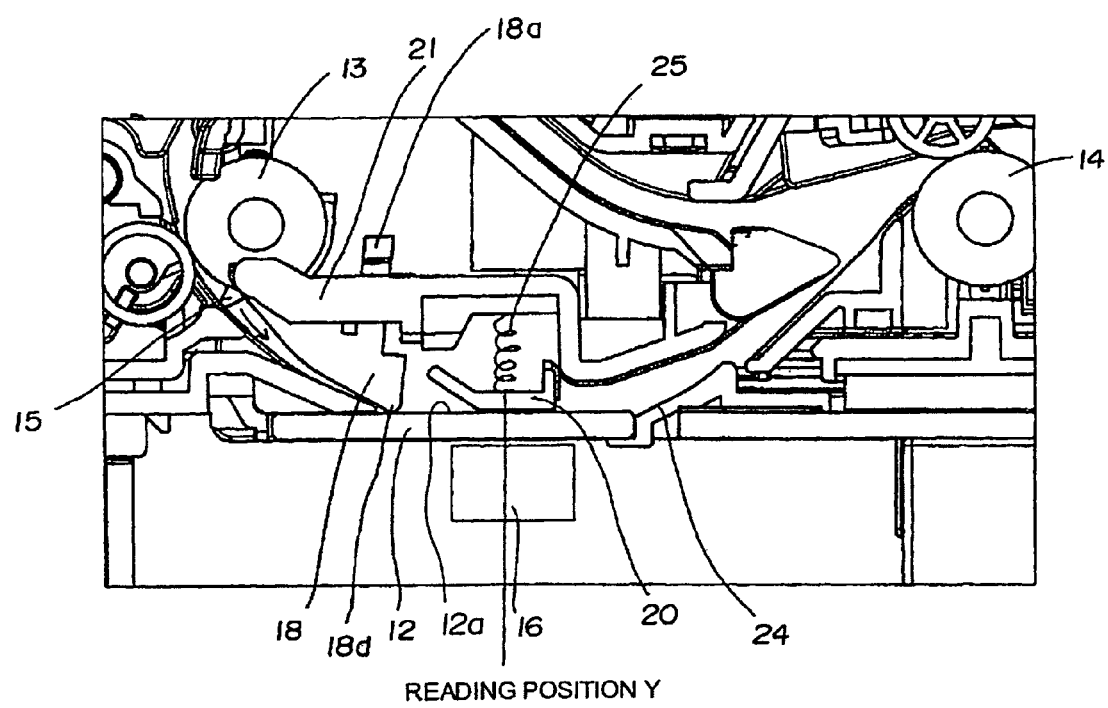
FIG. 1 is an enlarged view illustrating a conveyed original reading part.
Figure 2:
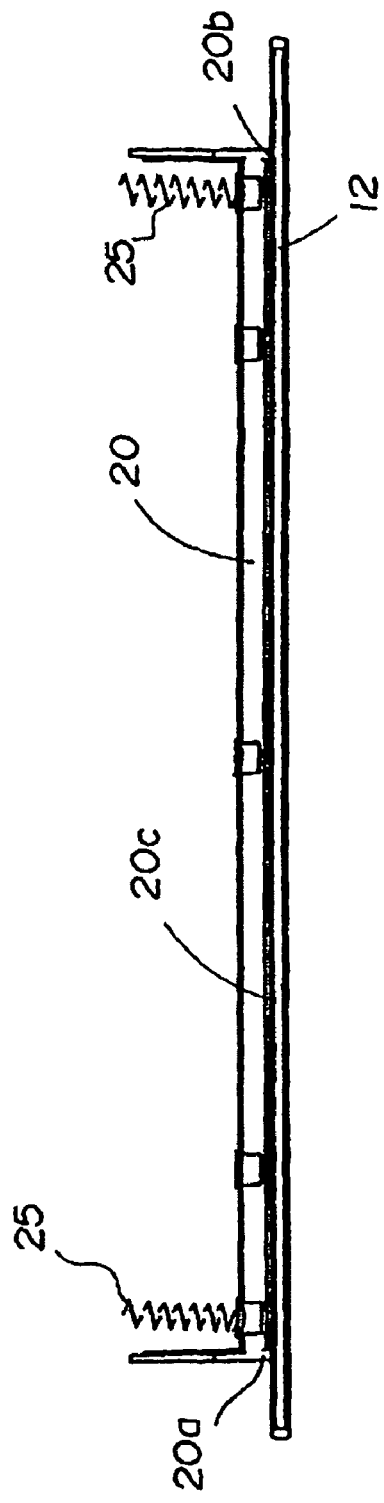
FIG. 2 is an explanatory view in which a reading white plate is viewed from the original conveying direction.
Figure 3:
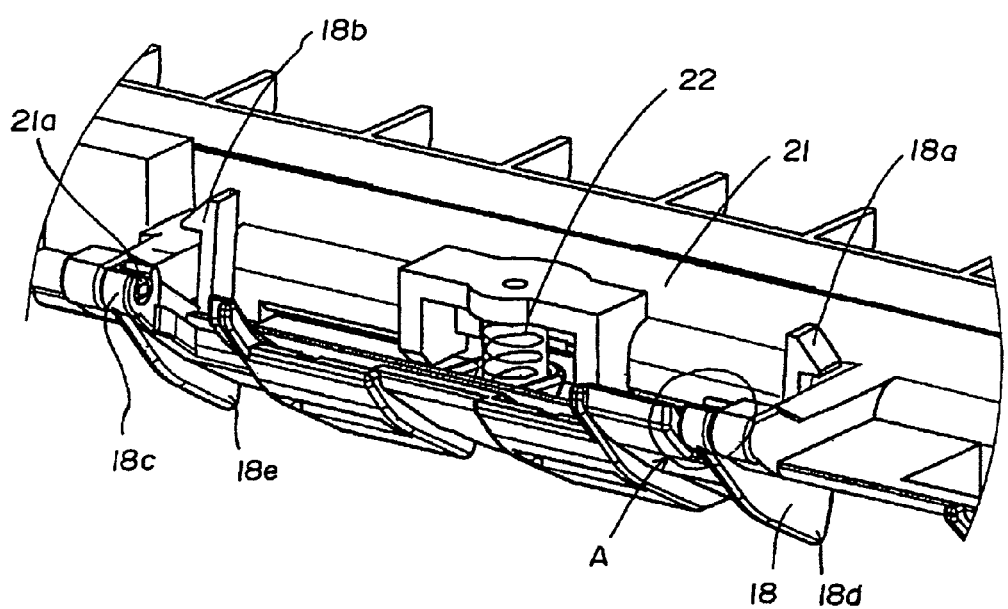
FIG. 3 is an explanatory view illustrating a feature of an image reading apparatus according to a first embodiment.
Figure 4:
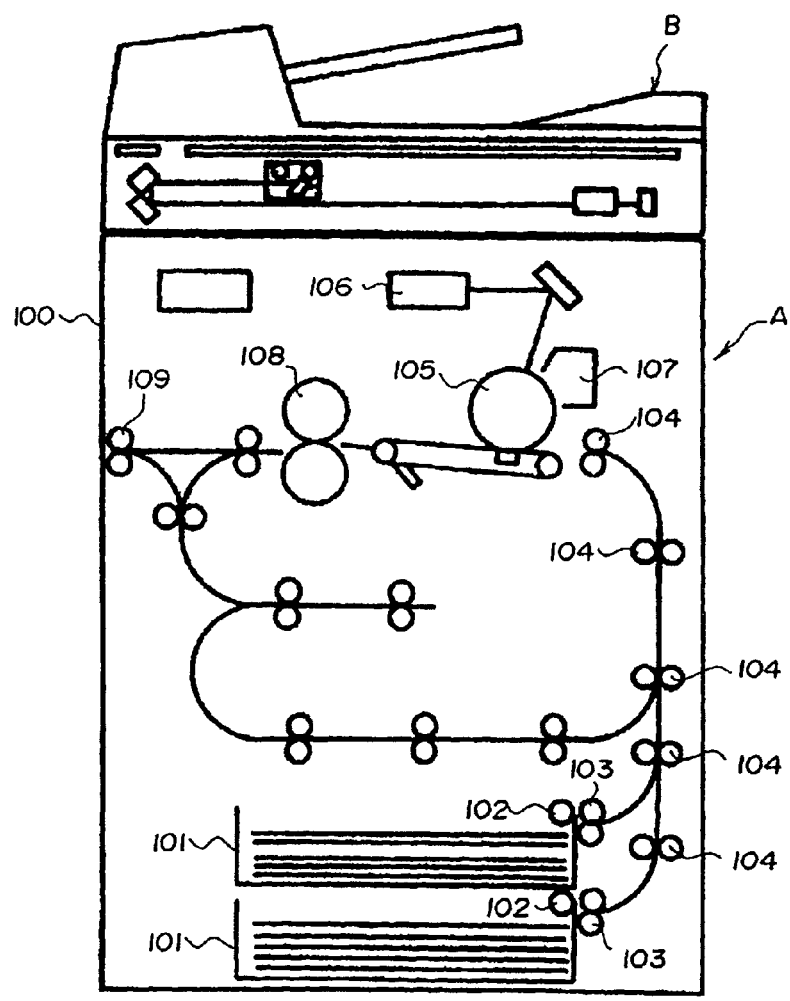
FIG. 4 is a schematic entire explanatory view of an image formation apparatus having the image reading apparatus.
Figure 5:
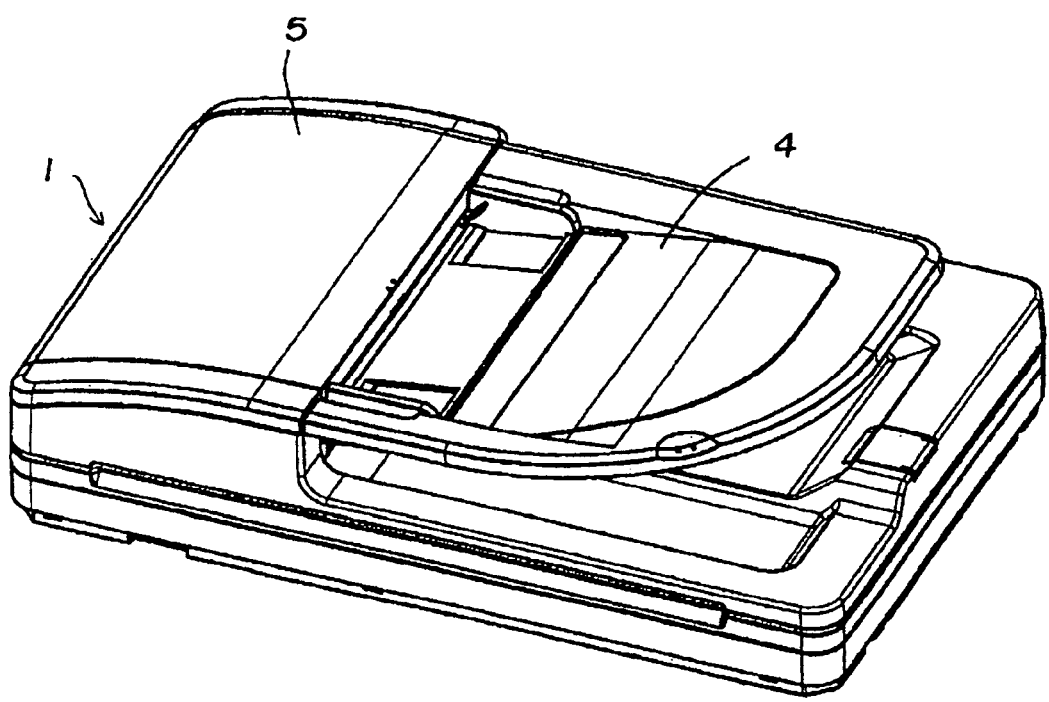
FIG. 5 is an explanatory perspective view of the image reading apparatus, viewed from an upper side.
Figure 6:
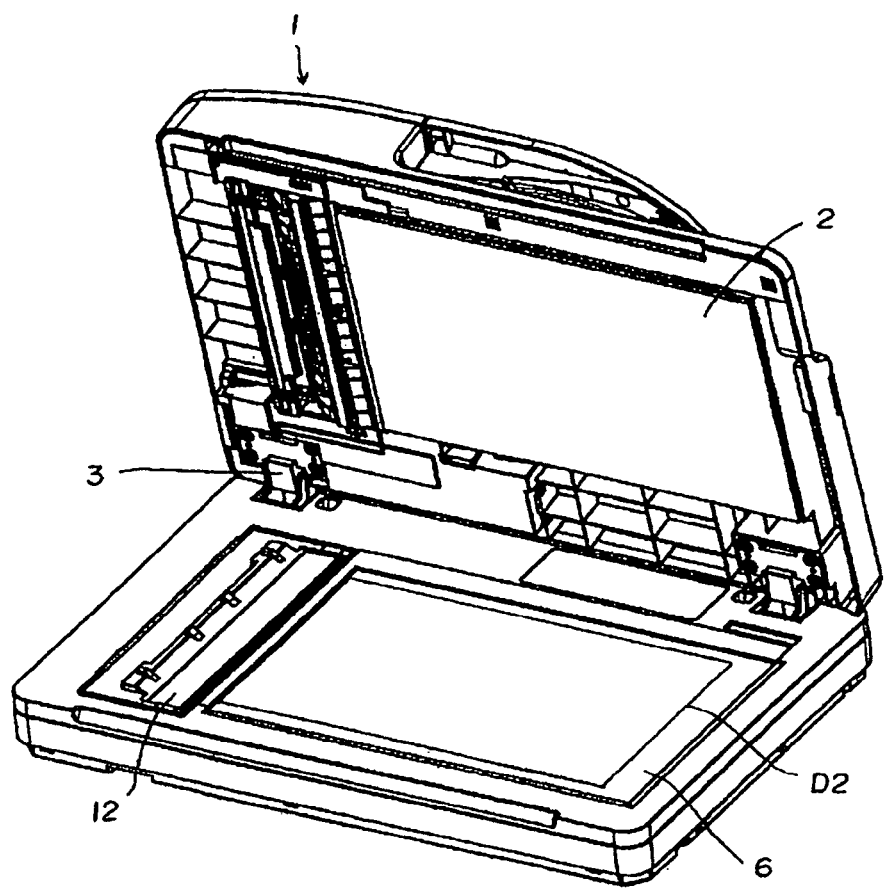
FIG. 6 is an explanatory perspective view viewed from an upper side in a state where a pressing plate unit of the image reading apparatus is opened.
Figure 7:
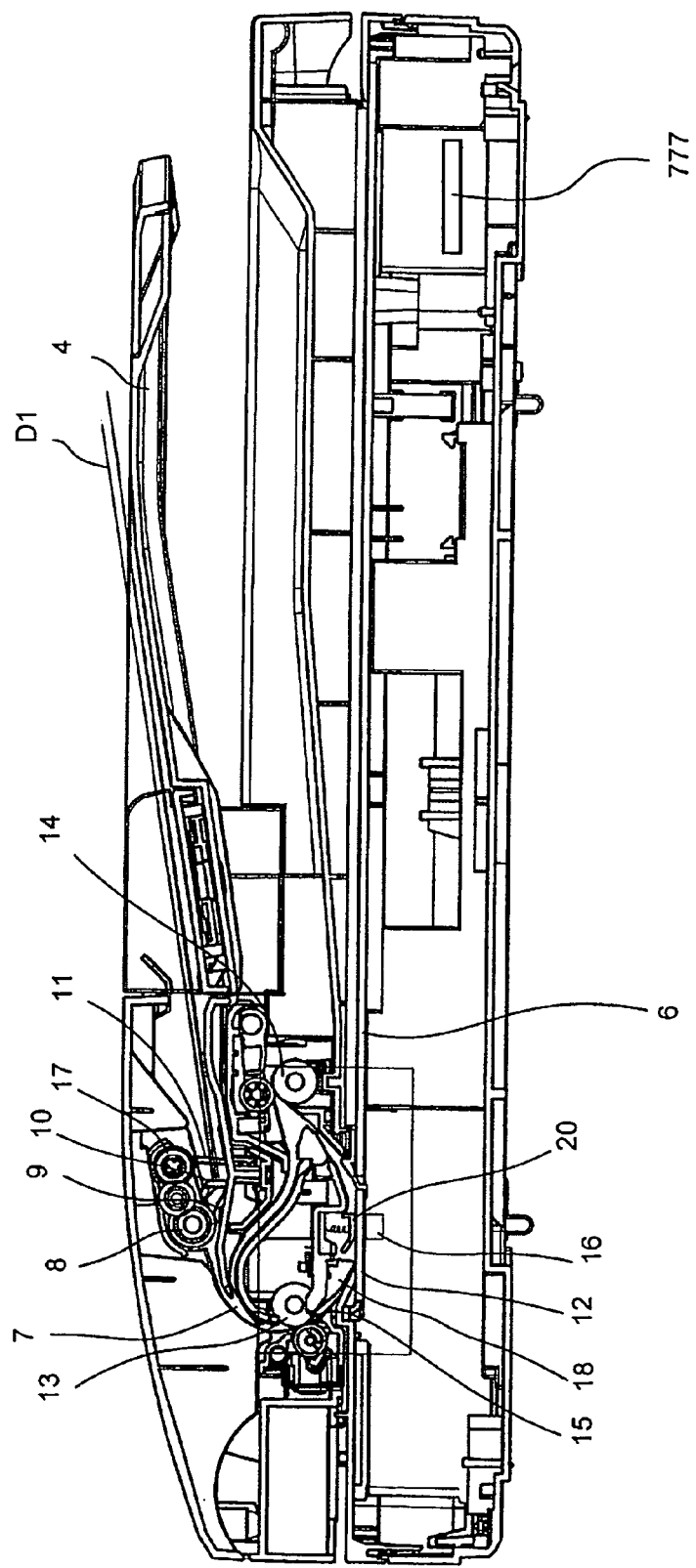
FIG. 7 is a principal explanatory cross-sectional view illustrating the image reading apparatus.

FIGS. 1 through 7 show an image reading apparatus and an image formation apparatus according to a first embodiment, and FIGS. 1 through 3 are exemplary views showing the feature of the image reading apparatus according to the first embodiment. Further, FIG. 4 is a schematic entire explanatory view of the image formation apparatus having the image reading apparatus, and FIGS. 5 through 7 are explanatory views showing the entire structure of the image reading apparatus.

[Image Formation Apparatus]

First, an image formation apparatus will be described with reference to FIG. 4. An image formation apparatus A of the present embodiment has an image reading apparatus B on an upper portion of an apparatus main body 100, and a copy machine forming an image on a sheet by an electronic picture image formation method as an image formation method is exemplified.

Sheet cassettes 101 are mounted on a lower portion of the apparatus main body 100. A sheet conveying path is formed from this sheet cassette 101 to an image formation portion, and feeding rollers 102, pairs of separation rollers 103, pairs of conveying rollers 104 are arranged. At the time of image formation, sheets accommodated in this sheet cassette 101 are conveyed by means of the feeding roller 102, and are separated by means of the pair of separation rollers 103 one by one, to be conveyed to the image formation portion by means of the pairs of conveying rollers 104.

A toner image is formed on a photosensitive drum member 105 which constructs the image formation portion in synchronization with the sheet conveying. For that purpose, image formation process means such as an exposure device 106 and a development device 107 are arranged adjacent to the photosensitive drum member 105. At the time of image formation, light in response to original information read by the image reading apparatus B is illuminated from the exposure device 106 to the photosensitive drum member 105 to form a static image, and toner is developed for this static image by means of the development device 107, so that obtained toner image is transferred to the conveyed sheet.

The sheet on which the toner image is transferred is conveyed to a fixing device 108, is heated and pressed to fix the toner image. Thereafter, the sheet is discharged to the outside of the apparatus by means of pairs of discharge rollers 109.

[Image Reading Apparatus]

Next, an image reading apparatus will be described with reference to FIGS. 5 through 7. FIG. 5 is an explanatory perspective view of the image reading apparatus, viewed from an upper side, and FIG. 6 is an explanatory perspective view viewed from an upper side in a state where a pressing plate unit of the image reading apparatus is opened. FIG. 7 is a principal explanatory cross-sectional view illustrating the image reading apparatus.

As shown in FIGS. 5 and 6, a white plate 2 is disposed on a static image reading portion located on the lower surface of a pressing plate unit 1 so that an original D2 is in intimate contact with a platen glass 6 which is a transparent member when a static image original is read, thereby to construct a structure in which the pressing plate unit 1 can be opened and closed about a hinge 3.

As shown in FIG. 7, a conveyed original reading part 5 has an original conveying path (hereinafter referred to as "U-turn path") of a roughly U-shaped form. An original stopper 10 regulating the front end position of an original D1 which is stacked on an original tray 4 is disposed on the U-turn path 7. Members for conveying the original D1 include a pick-up roller 17 which abuts an uppermost one of the originals D1 stacked on the original tray 4 to pick this up and a separation roller 8 and a separation pad 9 which separate and feed the originals D1 one by one. Further, original conveying members include a conveying roller 13 being an auto original feeding portion that conveys a fed original to a reading position and a pair of discharge rollers 14 being an original discharge portion which conveys an original which has passed the reading position. On the original conveying path, as sensors detecting the original, an original existence detecting sensor 11 detecting the existence of the original D1 on the original tray 4 and an original edge sensor 15 detecting a front end portion and a rear end portion of the original to be conveyed are attached.

On a lower portion of the reading position on the original conveying path, an intimate type image sensor 16 being a reading portion which reads the original located on the reading position is disposed. This intimate type image sensor 16 illuminates light from an LED array being a light source to an image information surface of the original D1, and allows reflected light reflected at the image information surface to be focused on the sensor element through a lens to read the image information.

At the conveyed original reading part 5, when an operator puts the original D1 on the original tray 4, the reading image surface of the original D1 is on the upper side thereof so that the original D1 can be set from the apparatus' operator side. At this time, the front end position of the original D1 is regulated by the original stopper 10, and by means of the original existence detecting sensor 11 the existence of the original D1 is detected.

A control section 777 controls the respective portions of the conveyed original reading part 5. Signals from the original existence detecting sensor 11 and the original edge sensor 15 are input to the control section 777. Signals from an operation section (not shown) are input to the control section 777. The control section 777 controls operations of motors that drive the pick-up roller 17, the separation roller 8, the conveying roller 13, and the pair of discharge rollers 14, thereby to control the conveyance of an original.

When start of reading is directed by an operator through the operation section (not shown), a drive portion (not shown) rotates. Thus, the original stopper 10 is pushed down, and the original D1 is conveyed to a separation portion between the separation roller 8 and the separation pad 9 by means of the pick-up roller 17. The originals D1 are separated one by one, so that an uppermost original D1 is separated and conveyed. The separated original D1 is conveyed along the U-turn path 7 by means of the conveying roller 13, and is further conveyed to the reading portion of the intimate type image sensor 16.

In the auto original feeding portion, after the front end portion of the original D1 is detected by means of the original edge sensor 15, reading of the image information by means of the intimate type image sensor 16 is started when it is conveyed a predetermined distance from that position. After the start of reading, the original goes to the pair of discharge rollers 14. After the rear end portion of the original D1 is detected by the original edge sensor 15, when it is conveyed a predetermined distance from that position, reading of the image information by means of the intimate type image sensor 16 is completed. This original D1 is discharged to the outside of the apparatus by means of the pair of discharge rollers 14.

In this way, in the conveyed original reading part 5, the above-described reading operation is repeated until the original existence detecting sensor 11 detects a nonexistence of an original.

[Original Floating Prevention Structure]

In the present embodiment, a pressing guide member 18 (a movable guide portion) disposed upstream of the reading position in the original conveying direction and a reading white plate 20 (second guide portion) for guiding the original at the reading position are provided in order to prevent an original from floating at the reading position at the time of reading the original. Next, a structure for that purpose will be described with reference to FIGS. 1 through 3. FIG. 1 is an enlarged view of a conveyed original reading part, and FIG. 2 is an explanatory view in which the reading white plate is viewed from the original conveying direction. FIG. 3 is an explanatory perspective view illustrating ambient structures of the original pressing member.

[Original Guide At Reading Position]

As shown in FIG. 1, a transparent contact glass 12 being a supporting member supporting an original located at a reading position Y is disposed on an upper portion of the intimate type image sensor 16, and a conveyed original is in intimate contact with a supporting surface 12a of the contact glass 12 to be read. For that purpose, a reading white plate 20 being a second guide portion for holding the original located at the reading position Y on the contact glass 12 is arranged. This reading white plate 20 is swingably attached to a lower guide member 21, and a force is applied to the member in the contact glass 12 direction by means of biasing springs 25. The reading white plate 20 being a guide member that guides an original at the reading position Y guides the original such that the original is pressed against the contact glass 12.

As shown in FIG. 2, the reading white plate 20 has abutting portions 20a, 20b abutting the contact glass 12 in the both ends thereof in the original width direction perpendicular to the original conveying direction and a separation portion 20c floating approximately 0.3 to 0.5 mm from the contact glass 12. The abutting portions 20a, 20b are disposed outside of the conveying area. That is, the abutting portions 20a, 20b are arranged apart from the conveying area in which the original is conveyed, in the width direction. The original passes through a lower portion of the separation portion 20c, so that it does not press the contact glass 12. Thus, it can be reduced that stain such as glue adhering to the original adheres to the contact glass 12, thereby improving reading of an image.

A force is applied to the reading white plate 20 toward the contact glass 12 by the biasing springs 25 as described above. However, since the reading white plate 20 of the present embodiment is a mold member, when a force is applied to the central portion of the reading white plate 20 by the biasing springs 25, the central portion is flexed to come in contact with the contact glass 12. Thus, in the present embodiment, the biasing springs 25 are arranged so as to apply a force to the both end portions of the reading white plate 20. Thus, the separation portion 20c prevents the conveyed original from floating without pressing the original, so that any object adhering to the original does not adhere to the contact glass 12.

[Pressing Guide Member]

As shown in FIG. 1, in the present embodiment, a pressing guide member 18 for pressing an original to the contact glass 12 is provided between the conveying roller 13 and the reading white plate 20 on the conveying path of an original. The pressing guide member 18 guided the original to the reading position and presses the original to the contact glass 12. This pressing guide member 18 is to prevent a large image drift due to flapping of an original at the original reading position Y when the original front end goes to a downstream side guide member 24 and the pair of discharge rollers 14 arranged downstream of the contact glass 12.

The pressing guide member 18 is movably supported by the lower guide member 21. The pressing guide member 18 is a mold member. Specifically, as shown in FIG. 3, a boss fitting portion 18c of the pressing guide member 18 is rotatably attached to a boss portion 21a of the lower guide member 21, and an A part facing them also has a similar structure. Thus, the pressing guide member 18 is pivotally supported on the lower guide member 21. A force is applied to the pressing guide member 18 toward the contact glass 12 by means of a biasing spring 22 being a biasing means.

As shown in FIG. 3, the pressing guide member 18 has, on a plurality of portions thereof in the original width direction, rib portions 18d, 18e protruding toward the contact glass 12. These rib portions 18d, 18e are formed along the original conveying direction. These rib portions 18d, 18e have a flexed shape so as to guide an original to the contact glass 12, and are constructed such that the rib portions 18d, 18e abut the contact glass 12 and that other portions do not abut it. In addition the shape along the original conveying direction of the rib portions 18d, 18e here includes a rib portion that in a state inclining to the original conveying direction not parallel to the original conveying direction.

The original conveyed by means of the conveying roller 13 is guided to the contact glass 12 by the pressing guide member 18, and is pressed to the contact glass 12 by the rib portions 18d, 18e. Thus, even if an original is thick, it does not float from the contact glass 12 to prevent the original from flapping, and image drift at the reading position Y can be reduced. Since the contact area between the rib portions 18d, 18e and the original is small, the friction noise produced by the rib portions and the original is reduced.

Thus, flapping of the original is prevented without increasing the biasing force of the reading white plate 20 and the pressing guide member 18, and reduction of friction noise is realized. In the above mentioned explanation, the pressing guide member 18 presses the original to the contact glass 12 by the biasing force of the biasing spring 22. But it can be formed that the pressing guide member 18 presses the original to the contact glass 12 by the weight of the pressing guide member 18 without a spring.

Second Embodiment

Next, an apparatus according to a second embodiment will be described with reference to FIGS. 8 through 11. Since the basic structure of the apparatus of the present embodiment is the same as that of the above-described embodiment, redundant explanation will be omitted, and here, a structure featuring the present embodiment will be described. The same reference numerals refer to members having the same functions as those of the above-described embodiment.

The present embodiment differs from the above-described embodiment in that the pressing guide member 18 and the contact glass 12 are constructed such that they can abut each other and that the pressing guide member 18 can be separated from the contact glass 12, in accordance with the original conveying condition.

Figure 8:
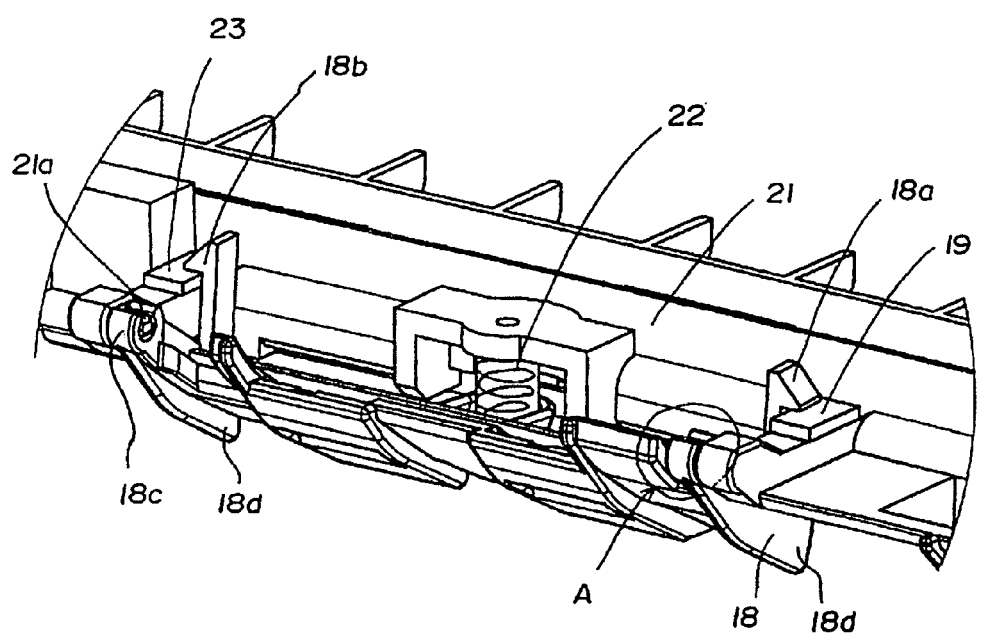
FIG. 8 is an explanatory perspective view of a pressing member according to a second embodiment.
Figure 9:
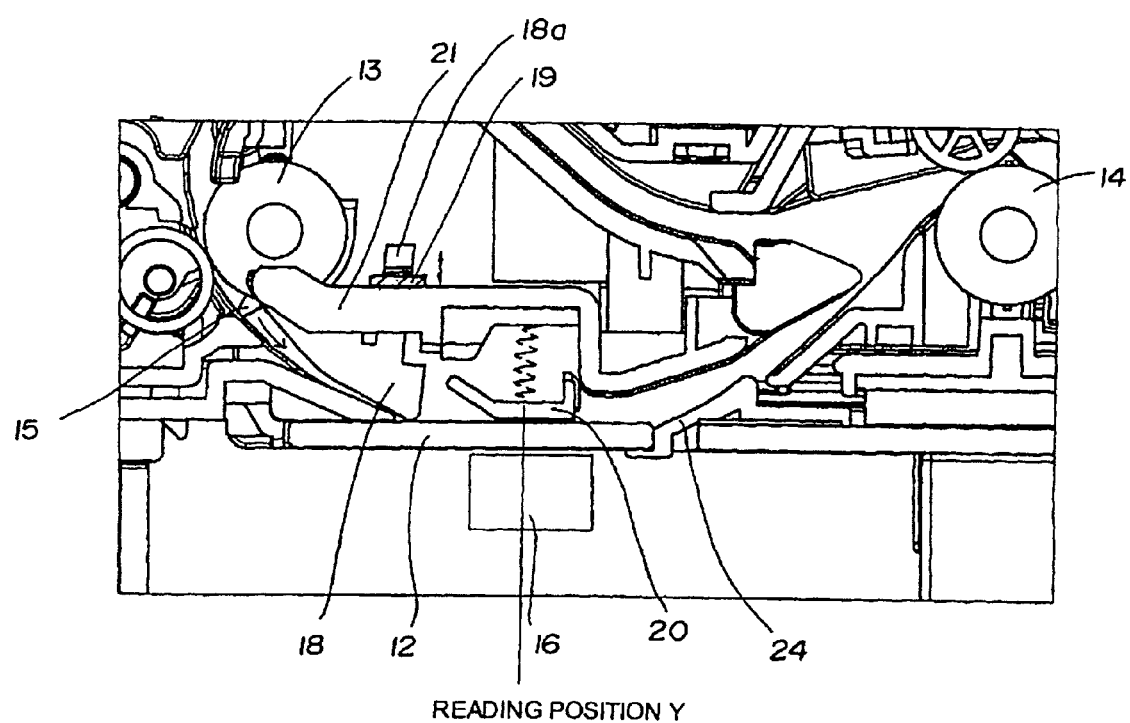
FIG. 9 is an explanatory cross-sectional view of an image reading portion according to the second embodiment.

For that purpose, as shown in FIGS. 8 and 9, a movement portion is provided for allowing the pressing guide member 18 which a force is applied thereto by the biasing spring 22 and abuts the contact glass 12 to move for separating the pressing guide member 18 and the contact glass 12. FIG. 8 is an explanatory perspective view of a pressing member according to the second embodiment, and FIG. 9 is an explanatory cross-sectional view of an image reading portion according to the second embodiment.

As shown in FIGS. 8 and 9, the pressing guide member 18 has swing regulating portions 18a, 18b, and their flexed distal ends engage the lower guide member 21. High molecular weight actuators 19, 23 being the movement portions are attached between the flexed ends of the swing regulating portions 18a, 18b and the lower guide member 21. These high molecular weight actuators 19, 23 have a characteristic that it expands and contracts by applying a voltage, and the present embodiment adopts ones having a characteristic of expanding and contracting when a positive voltage and a negative voltage are applied, respectively. The actuators may be formed of a compound body of a high molecular weight body and metal. A voltage applied to the high molecular weight actuator is controlled by the control section 777.

FIGS. 8 and 9 show a state in which the high molecular weight actuators 19, 23 are contracted. In this state, a force is applied to the pressing guide member 18 by the bias spring 22, and the rib portions 18d, 18e are at pressing positions where they can abut the contact glass 12.

Figure 10:
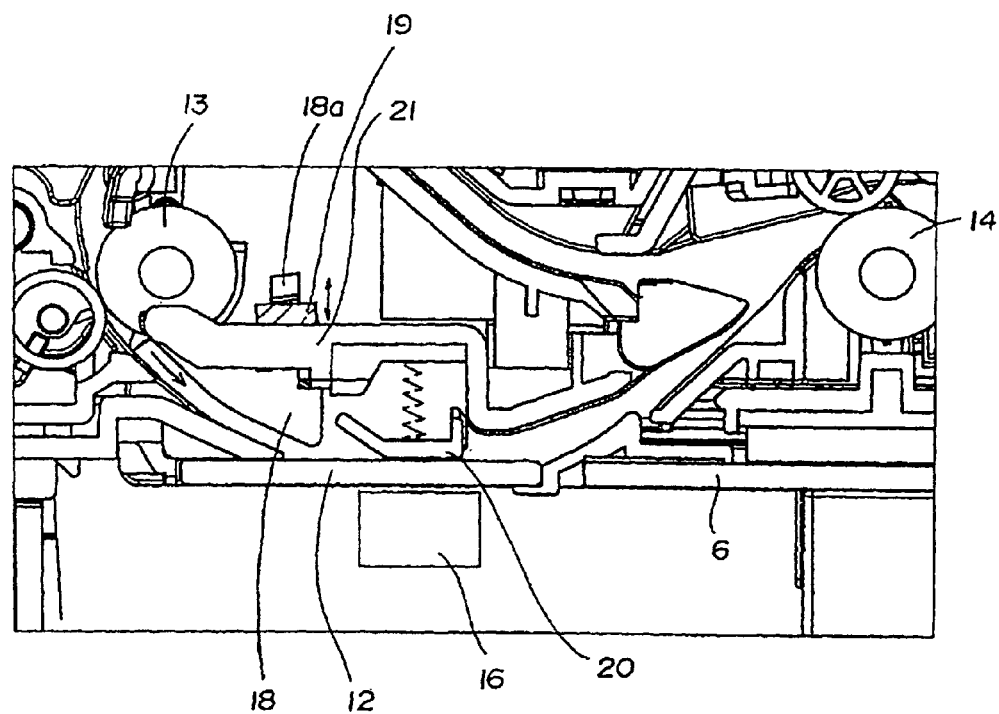
FIG. 10 is an explanatory perspective view illustrating a state wherein high molecular weight actuators 19, 23 are expanded.
Figure 11:
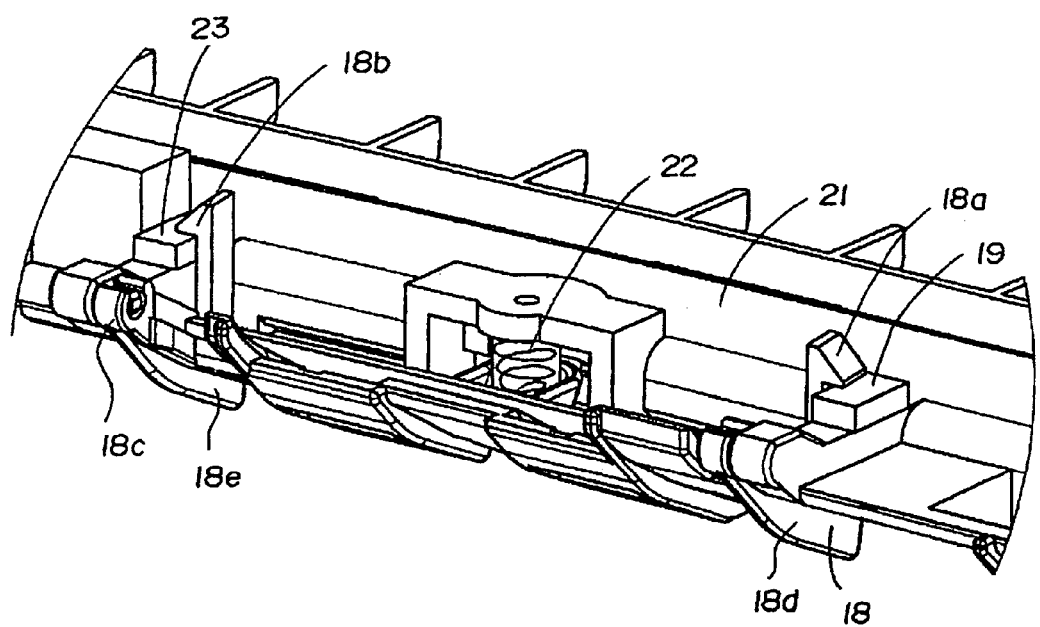
FIG. 11 is an explanatory cross-sectional view of that state.
Figure 12:
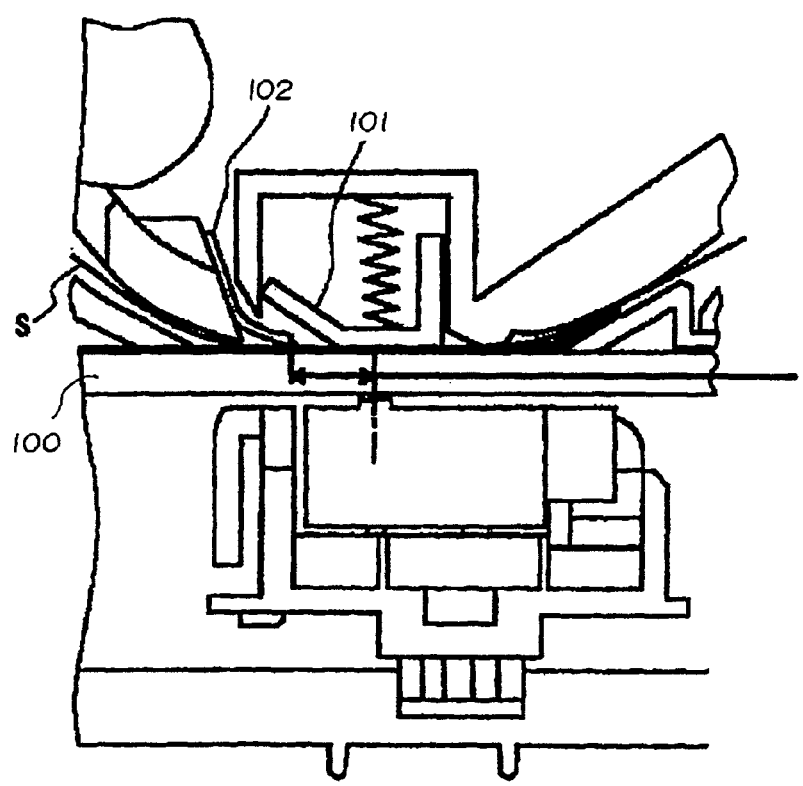
FIG. 12 is an explanatory view of prior art.

FIG. 10 is an explanatory perspective view illustrating a state wherein the high molecular weight actuators 19, 23 are expanded, and FIG. 11 is an explanatory cross-sectional view of that state. As shown in the drawings, when a positive voltage is applied to the high molecular weight actuators 19, 23, the high molecular weight actuators 19, 23 are expanded. Thus, the swing regulating portions 18a, 18b are pulled upwards, and the rib portions 18d, 18e are positioned at separation positions where they are separated from the contact glass 12. Here, expanding force of the high molecular weight actuators 19, 23 have been greater than the biasing force of the biasing spring 22, and the high molecular weight actuators 19, 23 allow the swing regulating portions 18a, 18b to move to separation positions against the biasing force of the biasing spring 22.

As described above, in the structure in which the pressing guide member 18 can abut the contact glass 12 and can be separated from it, in the present embodiment, first, until the conveyed original front end reaches the pair of discharge rollers 14, a negative voltage is applied to the high molecular weight actuators 19, 23. That is, when a signal to start reading is input from the operation section to the control section 777, the control section 777 applies a negative voltage to the high molecular weight actuators 19, 23. Thus, as shown in FIGS. 8 and 9, the high molecular weight actuators 19, 23 are contracted so that the rib portions 18d, 18e abut the contact glass 12 to allow the conveyed original to be pressed to the contact glass 12 by the biasing force of the biasing spring 22. Therefore, the original is prevented from flapping at the original reading position Y of when the original front end enters the downstream side guide member 24 and the discharge rollers 14.

After the conveyed original front end reaches the pair of discharge rollers 14, until the rear end of the original passes the conveying roller 13, a positive voltage is applied to the high molecular weight actuators 19, 23. That is, the control section 777 performs control such that a positive voltage is applied to the high molecular weight actuators 19, 23 before the rear end of the original passes the conveying roller 13 in response to the signal from the original edge sensor 15. In this way, as shown in FIGS. 10 and 11, the high molecular weight actuators 19, 23 are expanded so that the rib portions 18d, 18e are separated from the contact glass 12. Thus, the original is prevented from flapping due to load fluctuation applied to the original of when the conveyed original rear end passes the pressing guide member 18.

The control section 777 performs control such that a negative voltage is again applied again to the high molecular weight actuators 19, 23 after the rear end of the original passes the pressing guide member 18 in response to the signal from the original edge sensor 15. This is to prepare conveyance for pressing the original which is to be conveyed next.

Figure 13:
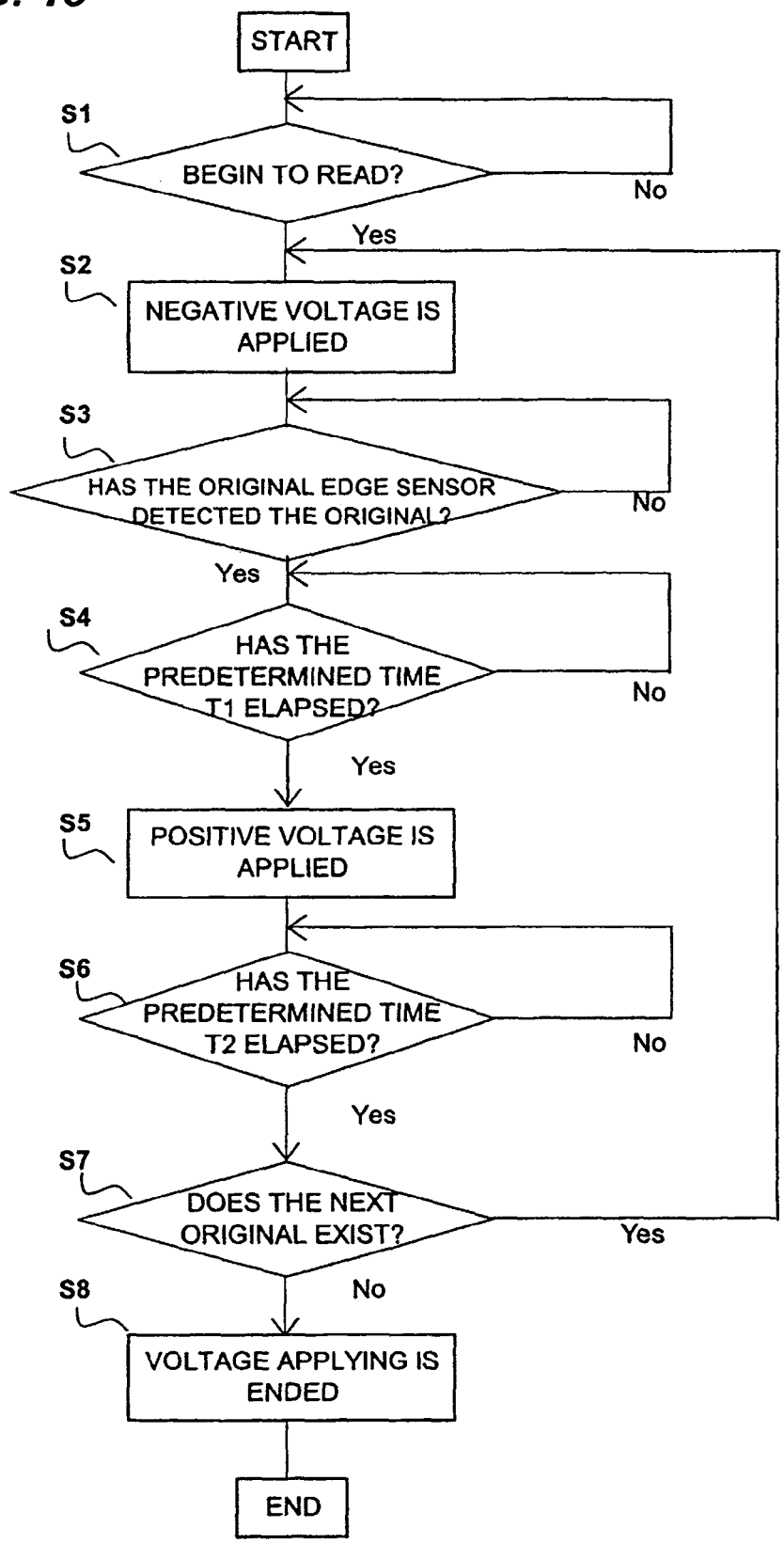
FIG. 13 is a flow chart for illustrating operations of a control section in the second embodiment.

The control of the control section 777 will be described with reference to the flow chart of FIG. 13.

First, the control section 777 determines whether the signal for beginning to read is input from the operation section (S1). If the signal for beginning to read is input, the control section 777 performs control such that a negative voltage is applied to the high molecular weight actuators 19, 23 (S2). By this, the pressing guide member 18 is located at the pressing position.

Thereafter, the control section determines whether the original edge sensor 15 has detected the conveyed original (S3). The control section 777 determines whether a predetermined time T1 has elapsed after the original edge sensor 15 detected the original (S4). This predetermined time T1 is set so as to be after reaching of the original front end to the pair of discharge rollers 14 and before passing of the original rear end through the conveying roller 13.

After the predetermined time T1 elapsed, the control section 777 performs control such that a positive voltage is applied to the high molecular weight actuators 19, 23 (S5). By the applying of the positive voltage to the high molecular weight actuators 19, 23, the pressing guide member 18 is located at the separation position.

Thereafter, the control section 777 determines whether a second predetermined time T2 has further elapsed (S6). The second predetermined time T2 is set so as to be after passing of the original rear end through the pressing guide member 18. Then, the control section 777 determines whether a next original exists or not (S7), and the process returns to S2 in the case where the next original exists. In the case where the next original does not exist, applying the voltage to the high molecular weight actuators is ended (S7), to finish the process.

When the pressing guide member 18 is located at the separation position, since the conveyed original is supported by the conveying roller 13 and the pair of discharge rollers 14, a stable conveying condition is obtained. Thus, even when the pressing guide member 18 is separated from the contact glass 12, original reading accuracy is rarely influenced.

In the present embodiment, the original is prevented from flapping as described above, and the load fluctuation of when the original rear end passes through the conveying roller 13 is prevented, thereby enabling the realization of the image reading apparatus in which image disturbance does not exist over the entire area where an image is read.

A feature in which the pressing guide member 18 is moved by the high molecular weight actuators 19, 23 has been exemplified. However, a moving portion to allow the pressing guide member 18 to move is not limited to the high molecular weight actuator. For example, a solenoid may be employed to move the pressing guide member 18.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-090561, filed Mar. 30, 2007, which is hereby incorporated by reference herein in its entirety.

What is claimed is:

1. An image reading apparatus comprising:
   a reading portion configured to read the image of the original at the reading position located on a supporting surface for supporting the original;
   an original feeding portion configured to convey an original to the reading position;
   a movable guide portion which faces the supporting surface and guides the original conveyed by the original feeding portion to the reading position; and
   a biasing member configured to apply a biasing force to the guide portion toward the supporting surface, wherein the movable guide portion has a rib portion, the rib portion projects toward the supporting surface and is formed along the original conveying direction, and the rib portion presses an original, that is read by the reading portion while the original is conveyed by the feeding portion, to the supporting surface by the biasing force of the biasing member.

2. The image reading apparatus according to claim 1 further comprising a second guide portion, disposed on a downstream of the rib portion, which guides an original at the reading position, wherein the second guide portion is movably provided, and the second guide portion guides an original so that the original located at the reading position is contact with the supporting surface.

3. The image reading apparatus according to claim 2, wherein the second guide portion is formed of a mold member and both end portions of the second guide portion in the direction perpendicular to the original conveying direction is applied a force toward the supporting surface.

4. The image reading apparatus according to claim 1, wherein the second guide portion has an abutting portion which abuts the supporting surface and a separation portion which is separated from the supporting surface, the original is passed between the supporting surface and the separating portion.

5. The image reading apparatus according to claim 1, further comprising a movement portion which moves the guide portion from a pressing position for pressing an original to the supporting surface by the biasing force of the biasing member to a separation position which is separated from the supporting surface.

6. The image reading apparatus according to claim 5, further comprising a downstream side conveying portion which is disposed downstream of the reading position in the original conveying direction to convey an original, wherein the movable guide portion is located at the pressing position until the front end of a conveyed original reaches the downstream side conveying portion, and the movable guide portion is moved to the separation position by the movement portion between after the front end of the conveyed original reaches the downstream side conveying portion and before the rear end of the original is passed the original feeding portion.

7. The image reading apparatus according to claim 5, wherein the movement portion is formed of a high molecular weight body or a compound body of a high molecular weight body and metal, and is a high molecular weight actuator which bends or which is contracted or expanded, by applying of a voltage.

8. The image reading apparatus according to claim 1, wherein the movable guide portion is formed of a mold member.

9. The image reading apparatus according to claim 1, wherein the movable guide portion is pivotally supported.

10. An image reading apparatus comprising:

a reading portion configured to read the image of the original at the reading position located on a supporting surface for supporting the original;

an original feeding portion configured to convey an original to the reading position; and a movable guide portion which faces to the supporting surface and guides the original conveyed by the original feeding portion to the reading position, wherein the movable guide portion has a rib portion, the rib portion projects toward the supporting surface and is formed along the original conveying direction, and the rib portion presses an original, that is read by the reading portion while the original is conveyed by the feeding portion, to the supporting surface by a weight of the movable guide portion.

11. An image reading apparatus comprising:

a reading portion configured to read the image of the original at the reading position located on a supporting surface for supporting the original;

an original feeding portion configured to convey an original to the reading position;

a guide portion which face to the supporting surface and guides the original conveyed by the original feeding portion to the reading position;

a movement portion which moves the guide portion between a pressing position for pressing an original to the supporting surface and a separation position which is separated more than the pressing position from the supporting surface, and a downstream side conveying portion which is disposed downstream of the reading position in the original conveying direction to convey an original, wherein the guide portion is located at the pressing position until the front end of a conveyed original reaches the downstream side conveying portion, and the guide portion is moved to the separation position by the movement portion between after the front end of the conveyed original reaches the downstream side conveying portion and before the rear end of the original is passed the original feeding portion.

* * * * *